INVENTOR.
EUGENE J. SEHM

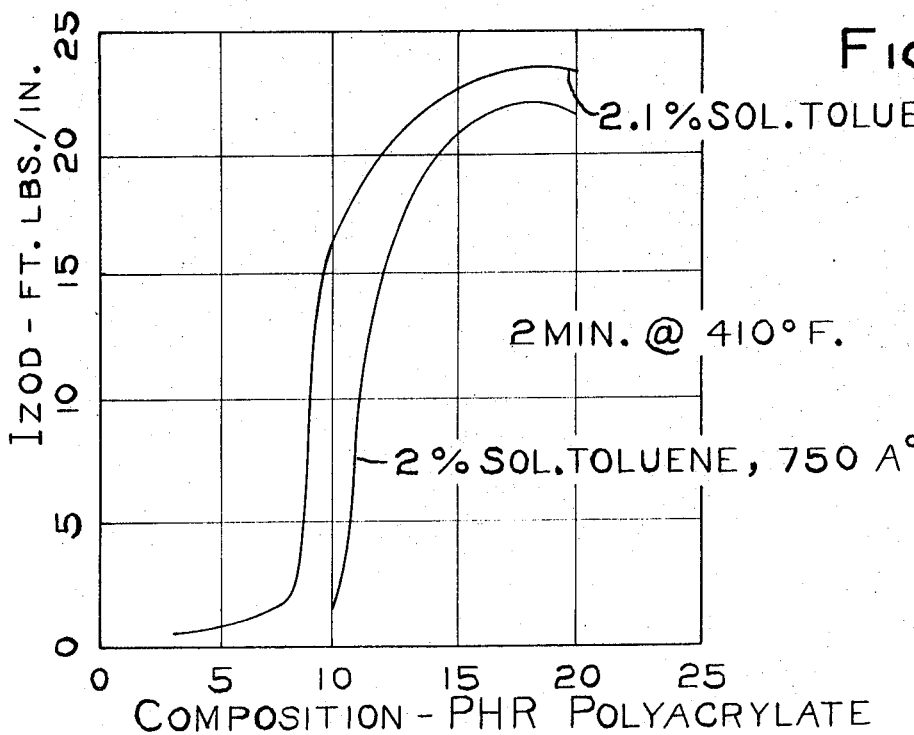
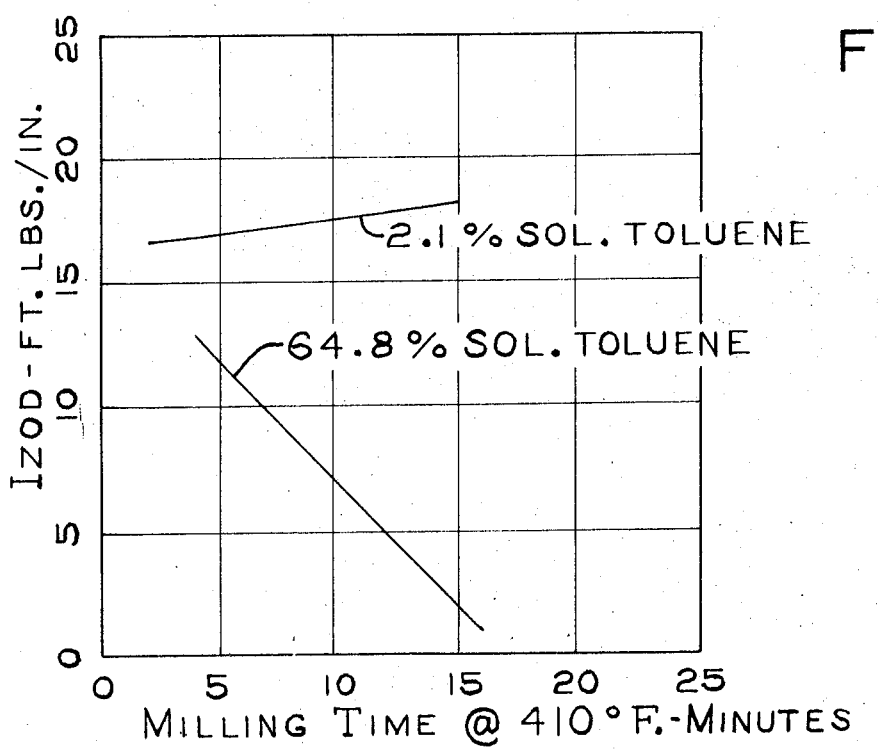

INVENTOR.
EUGENE J. SEHM
BY Robert W. Wilson
ATTY.

United States Patent Office 3,644,576
Patented Feb. 22, 1972

3,644,576
IMPACT-RESISTANT RESINOUS BLENDS CONTAINING VINYL CHLORIDE POLYMER AND METHOD OF MAKING SAME
Eugene J. Sehm, Akron, Ohio, assignor to The B. F. Goodrich Company, New York, N.Y.
Filed Oct. 5, 1967, Ser. No. 673,055
Int. Cl. C08f *37/18, 29/24*
U.S. Cl. 260—897 C                 17 Claims

ABSTRACT OF THE DISCLOSURE

Resinous blends are disclosed comprising a vinyl chloride base resin and a rubbery, essentially completely gelled and finely particulate polymer of an alkyl acrylate; such blends being more or less rigid and having high impact strength, good resistance to heat distortion and broad processing latitude. A method of making such blends is shown comprising adding such acrylate to the base resin as particles of latex-like proportions preferably imbedded in or dispersed in a hard matrix of a hard vinyl chloride resin, and fusing the resulting mixture under shear at 320° to 440° F. The resultant impact-resistant blends are useful in tubing, pipe, sheets and other structural forms.

CROSS REFERENCES TO RELATED APPLICATIONS

Some of the improved polyacrylate impact improvers employed in the process and blends of this invention and a method of making same are the subject of a copending joint application, Ser. No. 672,982, of even date, of Eugene J. Sehm and Elmer J. De Witt.

BACKGROUND OF THE INVENTION

Many vinyl chloride resins, and particularly unplasticized polyvinyl chloride, are excellent rigid, thermoplastic resins which have high strength (5000 lbs./sq. in. tensile strength or better), good resistance to distortion by heat, high chemical resistance, good electrical properties, and low flammability. However, the virgin forms (i.e. unplasticized) are low in impact strength, do not process well and are deficient in the flow properties required for high speed equipment for calendering, extrusion, injection molding, blow-molding, vacuum-forming and the like. An even more significant deficiency of virgin vinyl chloride resins is the high temperatures required to mix and process them, such temperatures some times being sufficiently high as to significantly degrade the resin during normal processing cycles.

DESCRIPTION OF PRIOR ART

For these reasons, it has become a common commercial practice to add minor amounts of one or more resinous and/or rubbery polymers to the vinyl chloride resin as processing aids and/or as impact-improving additives. The resinous additives provide improved processing and flow properties at more moderate processing conditions and the rubbery additives improve the resistance to impact. For example, resinous styrene/acrylonitrile copolymers are very efficient processing aids for vinyl chloride resins, this type of formulation being disclosed in U.S. Pats. Nos. 2,646,417 and 2,902,460. However, the styrene/acrylonitrile copolymers impart only modest increases in impact strength to vinyl chloride resins.

In U.S. Pat. 2,807,603, a rubbery terpolymer of butadiene, styrene and acrylonitrile is shown to be added to polyvinyl chloride along with the hard resinous styrene/acrylonitrile copolymer to produce three-component impact-resistant compositions. Variations upon the latter theme are shown in U.S. Pats. Nos. 2,802,809 and 3,167,598 wherein the hard, resinous styrene/acrylonitrile components are said to be first grafted to a rubbery butadiene copolymer before addition to the polyvinyl chloride.

Still, other variations are shown in U.S. Pat. 2,719,137 wherein the impact-improver is a rubbery copolymer of butadiene and an alkyl acrylate; in U.S. Pat. 2,791,600 where the resinous additive is a styrene/methyl methacrylate copolymer; in U.S. Pat. No. 2,943,074 where a separate rubbery butadiene/styrene copolymer and a hard, resinous polymethyl methacrylate are added to polyvinyl chloride; in U.S. Pat. 2,808,387 wherein a rubbery butadiene/styrene copolymer and a hard, resinous styrene/acrylonitrile copolymer are added to polyvinyl chloride; in U.S. Pat. No. 2,943,074, the rubbery butadiene/styrene copolymer is overcoated or over-polymerized with polymethyl methacrylate before incorporation into polyvinyl chloride; and in U.S. Pat. No. 3,264,373 wherein it is shown that a rubbery butadiene/acrylate copolymer is over-coated or overpolymerized with polymethyl methacrylate type copolymer before addition to the polyvinyl chloride.

Still another approach is the use of rubbery polyacrylates, that is, rubbery homo-polymers of alkyl acrylates, as impact-improvers in polyvinyl chloride, this approach being disclosed in U.S. Pat. No. 3,251,904. In the latter patent, the rubbery polyacrylate is shown to be over-polymerized with polymethyl methacrylate before incorporation into polyvinyl chloride.

All of these and other known additives used to improve the processing and/or impact strength of vinyl chloride resins suffer from various limitations and deficiencies. Those which contain unsaturated units derived from butadiene and/or other conjugated dienes are suspected of being deficient in long term stability, and/or have been noted as being otherwise susceptible to decomposition due to such unsaturated groupings in their structure. Others, such as the resinous styrene/acrylonitrile copolymers and polymethyl methacrylate improve processing and/or flow properties but may impair blend stability and impart only modest increases in impact strength. Some of these resinous and/or rubbery additives, when added in proportions sufficient for acceptable processing behavior and/or adequate impact strength, seriously impair the inherently good resistance to heat distortion possessed by many of the virgin vinyl chloride resins. Most of the rubbery additives impart impact strength which disappears on longer mixing such that the blends are said to have narrow or critical processing latitude.

The most serious deficiencies of the known acrylate additives, and particularly the polymerized alkyl acrylates are (1) they do not have a sufficiently wide processing latitude, (2) they have limited compatibility with vinyl chloride resins, (3) they exhibit erratic or critical processing behavior such as failure to impart high impact resistance unless the blend is prepared and fused over a narrow range of temperature and time, (4) the impact resistance of the blends tend to disappear quite rapidly when mixing and/or processing is continued, as in processing of premixed compounds or in re-working of scrap at high temperatures for more than a few minutes, and (5) such high proportions of the known polyacrylates often are required for optimum impact strength that the resistance of the blend to distortion by heat and/or its chemical resistance may be impaired.

SUMMARY OF THE INVENTION

This invention relates to resinous blends based on vinyl chloride resins and containing an improved, tough, rubbery, and highly-gelled polymer of an alkyl acrylate in a finely particulate form as an impact improving additive, which blends are more or less rigid, thermoplastic, resistant to deformation by heat and have high impact strength which is more tenaciously retained during high temperature processing than similar blends of vinyl chloride resins with other known rubbery impact improving additives. The invention also relates to an improved method of making such blends.

BRIEF DESCRIPTION OF THE DRAWINGS

Of the drawings:

FIG. 3 is a graph in which Izod impact strength is plotted versus composition (expressed as phr. polyacrylate) of blends of polyvinyl chloride with a gelled polyethyl acrylate, which blends have been prepared by milling for 2 minutes at 410° F.;

FIG. 4 is a graph in which Izod impact strength is plotted against time of milling, in minutes at 410° F., as determined on blends of polyvinyl chloride with 10 phr. of a gelled polyethyl acrylate;

DETAILED DESCRIPTION

Figure 1:
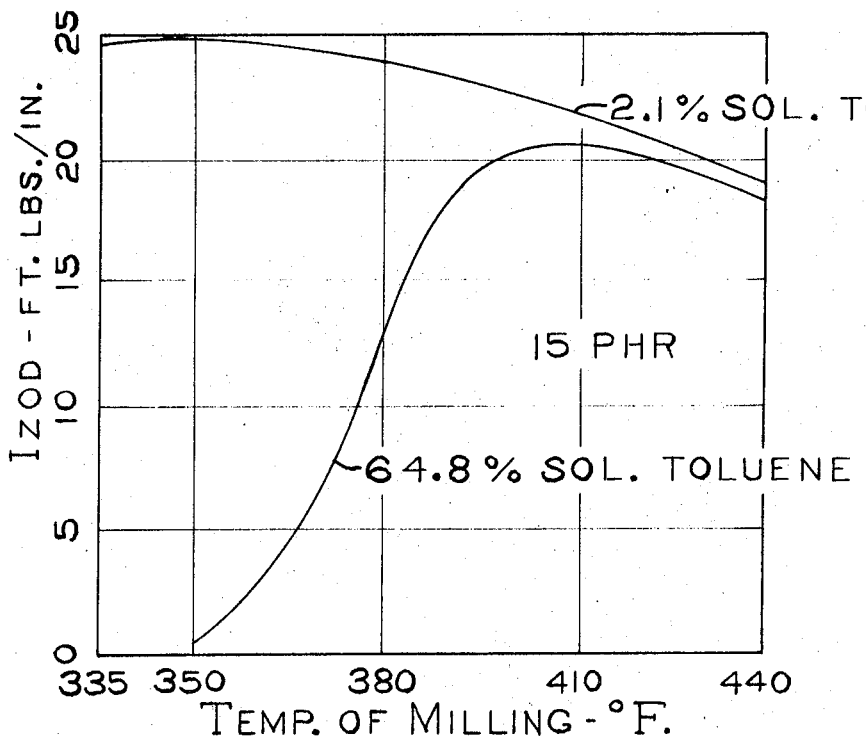
FIG. 1 is a graph in which the ASTM Izod impact strength in ft. lbs./in. of notch is plotted against temperature of milling in degrees F. as determined on blends of polyvinyl chloride containing 15 phr. of, respectively (curve marked "2.1% sol. toluene"), a gelled polyethyl acrylate and of (curve marked "64.8% sol. toluene") a normal, highly-soluble polyethyl acrylate.

In accordance with the present invention, it has been discovered that superior blends of vinyl chloride resins with rubbery polymers of the alkyl acrylates are produced when (1) the polyacrylate is prepared from the monomeric alkyl acrylates in which the alkyl group contains from 2 to 4 carbon atoms, (2) when the polyacrylate is substantially-completely gelled yet which is tough and rubbery in nature, and (3) when the gelled polyacrylate is added to the vinyl chloride base resin in the form of very small particles of a particle size range given below. Also, in accordance with the present invention, there is provided an improved process for making such blends wherein the substantially-completely gelled polyacrylate is added to the vinyl chloride base resin in the form of latex-like particles of average diameter between about 500 and about 8000 A. and the blend is fused under high shear at high temperatures in the range from about 320° to about 440° F.

By the terms "substantially-completely gelled" or "insoluble" as applied to the rubbery polyacrylate ingredient of the blends is meant a material which is essentially completely-gelled or insoluble and when tested by a special ultra-centrifuge technique described below, is found to contain less than about 20%/wt. of material soluble at room temperature in toluene. More preferred members of this class contain less than 10%/wt. of toluene-soluble material. As will appear in the working examples below, the most preferred materials usually contain less than about 5%/wt. of toluene-soluble material. The gel in the polyacrylate components of this invention is a form of micro-gel which is difficult to remove by ordinary filtration procedures. In some cases, herein, the solubility of the polyacrylate is expressed in terms of its solubility in tetrahydrofurane (THF). It should be understood in such cases, that THF is a somewhat poorer solvent than toluene and that the polyacrylate usually exhibits a solubility somewhat higher in toluene than THF. This difference in solubility is illustrated in several of the working examples below.

By the term *rubbery*, as applied to the polyacrylate is meant an elastomeric nature, i.e. the material must be capable of being elongated at least 100% and which when released will recover at least 75% of its original length.

By the term *impact-resistant resinous blends* is meant a thermoplastic material low in non-polymeric plasticizer loading (i.e. below about 20 parts/wt. of liquid or non-polymeric plasticizer other than the polyacrylate per 100 parts/wt. of vinyl chloride resin), by having an ASTM Izod impact resistance of at least 2 ft. lbs./inch of notch, more preferably at least 5 ft. lbs./inch of notch, by being more or less rigid (i.e. having a heat distortion temperature above about 25° C.), and by comprising a vinyl chloride resin base and, as an impact-improver or modifier, a tough, rubbery, essentially completely gelled polymer of an alkyl acrylate dispersed in or dispersible in the vinyl chloride resin as a finite particle having an average particle size of the order of latex particles (i.e. from about 500 to about 8000 A. in average diameter).

It has been confirmed that in the blends of this invention the rubbery, gelled polyacrylate is dispersed in the harder vinyl chloride resin as essentially its original particles even after long-continued, high-shear, high-temperature mixing. This is clearly apparent in before-and-after electron microscope photographs. This is believed to be the reason why the blends of this invention do not suffer loss of impact strength on continued mixing or remixing to the degree observed for blends containing other known rubbery impact-improving addition including the normal or more highly soluble polyacrylate of the prior art.

As used throughout this specification, temperatures of mixing, blending, fusion, molding or other processing operations are quoted in terms of the temperature in ° F. of the metal surfaces of the mixing equipment in contact with the resinous material. Thus, temperatures of milling, for example, are quoted in terms of the temperatures, as determined by a contact pyrometer, of the mill rolls, per se. Stock temperatures usually will be somewhat higher than the quoted processing temperatures.

EFFECT OF PARTICLE SIZE

It has been noted in some cases that the resistance to heat distortion of the blends, particularly thos containing gelled polyethyl acrylates, is much less affected by the addition of the polyacrylate if the gelled polyethyl acrylate is added to the blend as medium to large particles having a diameter from about 1500 to about 8000 A. With gelled polyethyl acrylates still better results are obtained with somewhat larger particles ranging from about 2000 to 8000 A. in diameter than when smaller particles are employed. Best results are achieved in the range from about 2000 and about 4000 A. Gelled polymers of the higher acrylates such as those of n-butyl acrylate do not show as strong an influence of particle size as do the polyethyl acrylates.

The particles size of the vinyl chloride resin also has been found to be of some significance and to affect the impact strength of the blend to some degree. Generally, better blends are obtained if the vinyl chloride resin is free of "dust" or very small particles below about 5 microns in diameter. Resins of this character will pass a 42 mesh screen but will be retained 100% by a 325 mesh screen (Tyler scale).

As indicated above, the gelled polyacrylate ingredient must be added to or be blended with the vinyl chloride resin in the form of particles having dimensions of the order of latex particles in the range of from about 500 to about 8000 A. in average diameter. Unless special techniques are employed during polymerization, especially with ethyl acrylate, the latex particles are likely to be below the above range. Mixing of solid, rubbery and massive forms (i.e. sheet rubber) of any of the gelled polyacrylates with the vinyl chloride base resin is most difficult and the resulting blends have very poor properties because of (1) limited compatibility and wide hardness differences between the rubbery polyacrylate and the hard vinyl chloride resin and (2) highly variable dispersion of the soft polyacrylate in the harder vinyl chloride resin matrix. Thus, while it is not all essential to effect blending of the polyacrylate and vinyl chloride resin by blending the polymers in latex form, it is essential that the polyacrylate be not subjected to mechanical working before incorporation into the vinyl chloride resin because such prior mechanical working destroys the original particulate identity of the polyacrylate latex particles. A crumb-type of product produced by coagulation or spray-drying of a latex of a gelled polyacrylate without mechanical working or compacting is a loose aggregate of the individual particles of gelled material and such an agglomerate appears to be broken down into, and dispersed as, its original particles when a blend of such a coagulum is mixed with a vinyl chloride resin on a plastics mill, Banbury or other shear-type mixing apparatus.

PREFERRED BLENDING PROCESS

While the blends of this invention can be prepared in many ways, best and most reliable results are obtained when the gelled polyacrylate is added to the vinyl chloride base resin as a latex-derived particle having an average diameter between about 500 and about 8000 A. and the resulting mixture is subjected to intense mechanical shear at a temperature between about 320° and about 440° F. to effect fusion into an integral mass and proper dispersion of the gelled polyacrylate. Mixtures merely heated at these temperatures in the absence of shear, as by mere sintering, do not develop the expected physical properties. It may be that fluxing and shearing involved in the method of this invention develops minute adhesions between the otherwise more or less immiscible particles of gelled polyacrylate and the hard vinyl chloride resin matrix.

The optimum fusion temperature appears to vary somewhat with the base vinyl chloride resin and to some extent with the particular gelled polyacrylate. Polyvinyl chloride and gelled, rubbery polyethyl acrylates fuse very well at any temperature in the range of from about 320° to about 440° F. whereas similar blends based on vinyl chloride/propylene copolymers fuse best at from about 350° to about 400° F. The higher polyacrylates such as gelled, rubbery polybutyl acrylates fuse best with vinyl chloride resins in the range of from about 335° to about 420° F. Thus, the preferred range of processing temperature is in the range of from about 320° to about 420° F.

Pulverulent or granular forms of the vinyl chloride resin and of the gelled polyacrylate can be combined, with or without other compounding ingredients such as fillers, stabilizers, colorants, opacifiers, and the like, and the resulting powder blend subjected to the fusion step as by milling on a close-set two-roll plastic mill, by mixing in an internal mixer or in an extruder, and the like. Likewise, the gelled polyacrylate in the form of a latex can be blended with a latex or suitably fine suspension in water of the vinyl chloride resin and the water content of the resulting liquid mixture removed as by co-coagulation or co-precipitation and filtering, or the mixture can be freeze-coagulated or drum dried or spray-dried directly. The co-precipitated or spray-dried materials must be subjected to mechanical working before they will develop optimum properties.

A particularly preferred and economically attractive method of making the blends is to effect in situ suspension polymerization of the vinyl chloride resin in the presence of latex-sized particles of the gelled polyacrylate. The latter may either be present in the polymerization medium as a latex or as a slurry of crumbs resulting from coagulation of such a latex. Surprisingly, the product in either case is obtained directly in the form of macrogranular particles. The granules obtained starting with a latex have a screen analysis in which 99%/wt. or better of the particles are in the range from about 150 to about 600 microns. Electron microscope photographs show these particles to consist of a continuous matrix of the vinyl chloride resin in which is uniformly dispersed the very small particles of gelled polyacrylate. Such a slurry type of product requires only to be filtered, washed and dried. The fluxing and shearing operation described above is required to convert the composite type product to an impact-resistant rigid composition.

In general, the blends of this invention have very much wider processing latitude than known formulations. Wide processing latitude in this context means that the blends of this invention not only will be well-fused and develop high impact strength over a wider range of processing temperatures (320°–440° F. or more) but also the high impact strength is much more tenaciously retained permitting longer-continued processing at high temperatures. The type of shear required during the final blending step is difficult to define. However, the shear equivalent to that obtained on a two-roll plastics mill equipped with oil or steam-heated rolls with the rolls closely set, for example, a mill having differential rolls four inches in diameter operated at a speed of 12 r.p.m./18 r.p.m. at up to 35° F. or 21 r.p.m./32 r.p.m. for temperatures above 335° F., provide excellent mixing and fusion with roll spacings of about 0.016 inch. Similar mixing can be obtained in larger mills, in Banbury mixers, in the screw feeder and nozzle sections of injection molding machines and in the barrel of an extruder properly equipped with temperature-controlled barrels and/or screws and having a screw and die design adapted to expend a moderate amount of work on the mixture. Most reliable mixing is obtained on the two-roll plastic mill where full control of temperature and the amount of shear or working can be obtained and the degree of mixing, dispersion and fusion of the stock can be fully observed. Only from about 2 to about 5 minutes of mill-mixing after band formation under these conditions is required to develop maximum resistance to impact in the blend, although the blends of this invention are unique in the tenacity with which they retain their impact strength when mixing is longer continued.

The blends of this invention will find use in any application for rigid and semi-rigid vinyl chloride resins. Thus, they are admirably suited to be extruded into pipe, tubing, rods, sheets and plates and molded into fittings for joining plastic pipe and tubing. Sheets and films prepared from blends of this invention are well adapted to vacuum-forming and air-blowing applications such as for example, the formation of bottles and containers. Blends of this invention also have been injection molded where their resistance to high temperatures and good melt flow characteristics are taken advantage of.

BLEND COMPOSITION

The blends of this invention will comprise from about 80% to about 98%/wt. of the vinyl chloride resin and from about 2% to about 20%/wt. of the rubbery, gelled polyacrylate calculated on the total of these two polymers in the blend. The exact proportions within these limits will depend on the properties desired, particularly on the degree of processing ease required in the finished blend, on the impact resistance and resistance to heat distortion desired, and to some extent on the loading of fillers and other compounding ingredients. In general, with from about 2% up to about 5%/wt. of the polyacrylate the blends will usually be more or less ductile (i.e. exhibit a ductile rather than brittle type fracture) and exhibit modest impact strength (i.e. an Izod impact from about 0.5 to 3 ft. lbs./in. of notch). With proportions above about 20%/wt., the rigidity and resistance to heat distortion and to solvents and chemicals are likely to be lower. Impact resistance usually reaches optimum values in the range of from about 5 to about 15%/wt. of the polyacrylate and this range is preferred. Composition will be expressed hereinafter as "Phr." which is an abbreviation for parts (by weight) of polyacrylate per hundred (parts/wt.) of (total) resin.

VINYL CHLORIDE RESIN

The vinyl chloride resin employed in the blends of this invention must be (1) thermoplastic, (2) be low in liquid or non-polymeric plasticizer (i.e. below 10%/wt. of such plasticizers), and (3) be of appreciable molecular weight. The vinyl chloride resin can be any resin of such description prepared from a monomeric material consisting of mono-vinylidene monomers, and containing at least 90% by weight of vinyl chloride. While not preferred in all cases, co-monomers such as vinylidene chloride, alkyl acrylates, alkyl alkacrylates, styrene, acrylonitrile, vinyl acetate, 1-olefins such as propylene, n-butene and the like, and others may be employed in the production of the vinyl chloride resin. Preferred vinyl chloride resins are selected from polyvinyl chloride and copolymers of vinyl chloride and propylene (produced from mixtures consisting of vinyl chloride and 0.5 to 15% by weight of propylene) containing from about 0.5 to 10% by weight of combined propylene, most preferred from about 1% to about 7% by weight of combined propylene. Polyvinyl chlorides for use in the blends of this invention should have an inherent viscosity (according to ASTM D1243 using 0.2 gram of resin in 100 ml. of cyclohexanone at 30° C. between about 0.45 and about 1.45 with viscosities in the range of from about 0.55 to about 1.20 being most preferred. Vinyl chloride propylene copolymers of the class described should contain from about 0.5 to about 10%/wt. of combined propylene, more preferred from about 1% to about 7%/wt. of combined propylene and have an inherent viscosity between about 0.55 and 1.60 (determined in same manner as described above).

PREPARATION OF POLYACRYLATES

The rubbery gelled polyacrylates employed in the blends of this invention are those produced from monomeric mixtures free of conjugated unsaturation and containing (1) at least 80%/wt. of one or more monomeric alkyl acrylates in which the alkyl group contains from 2 to 4 carbon atoms, most preferably n-butyl acrylate and (2) from about 0.5 to 1.0% to about 8%/wt., more preferably from about 1% to about 4%/wt., of a gel-inducing co-monomer free of conjugated unsaturation, which is readily copolymerizable with the alkyl acrylate, and which is selected from the class consisting of (a) the monomeric acrylic polyesters of polyhydric alcohols and an acid selected from the class consisting of acrylic and methacrylic acids, which polyesters contain from 2 to 6 acrylic ester groups per polyester molecular and (b) the polyalkenyl polyethers in which from 2 to 6 alkenyl groups per molecule are present each in a terminal vinylidene ($CH_2$=C<) grouping and which are prepared by the Williamson synthesis by reaction of an alkenyl halide with an alkaline solution of a polyhydric alcohol. Monomers of this restricted class are required because of their ability (1) to copolymerize quite readily, (2) they appear to enter the copolymer chain in a uniform but random fashion and at a frequency determined, apparently, by their concentration, producing highly rubbery products, (3) they appear to have the ability to generate a tough gel not readily broken down by mastication, and (4) they do not impair the desirable stability to heat and light normally possessed by polymerized alkyl acrylates. The copolymers formed by these monomers are essentially completely gelled (i.e. soluble to the extent of less than 20%/wt. in toluene, preferably soluble less than 10%/wt.).

Illustrative gel-inducing co-monomers of the above class are diethylene glycol diacrylate (abbreviated herein as "DEGDA"), diethylene glycol dimethacrylate, trimethylene glycol diacrylate, butylene glycol diacrylate, butylene glycol dimethacrylate, pentamethylene glycol diacrylate, diacrylate, trimethylol propane triacrylate (abbreviated herein as "TMPTA") trimethylol propane trimethacrylate, the tetraacrylate ester of pentaerythritol, polyallyl ethers of sucrose containing from 2 to 6 allyl ether groups per molecule, polyallyl ethers of dextrose, and others. Most preferred as gel-inducing co-monomers are the monomeric acrylic polyesters of polyalkylene glycols containing from 2 to 6 acrylate ester groups per polyester molecule.

In addition, up to about 19.5%/wt., of other mono-vinylidene monomeric materials can be present in such monomeric mixtures including such monomers as the alkyl acrylates containing more than 8 carbon atoms in the alkyl group, vinyl chloride, vinylidene chloride, styrene, acrylonitrile, acrylamide, methyl methacrylate, vinyl acetate, ethylene, propylene, n-butene, n-hexene, n-octene, 2-ethyl-hexene-1, and other alpha-mono-olefins, vinyl ethyl ether, vinyl ethyl ketone, vinyl pyridine, and many others.

The polyacrylates of this invention may be prepared from monomeric mixtures containing at least 80%/wt. of one or more of ethyl acrylate, propyl acrylate, isopropyl acrylate, n-butyl acrylate, isobutyl acrylate and others.

The monomeric material just described are polymerized to form the gelled polyacrylate impact-improver by any of the known techniques which favor the formation of a latex. The direct polymerization of the monomeric material in aqueous emulsion or dispersion leading to the formation of a latex is by far the most economical and controllable method. When polymerization is initiated in an aqueous medium which is low or lacking in emulsifier or dispersant plus a controlled continuous or portionwise addition of emulsifier and monomer during the polymerization, fewer and larger particles will be formed and narrower particle-size distribution will be obtained, all as is well known to the art. Such polymerization is initiated in the absence of modifiers employing peroxide-type and redox-type catalysts of the water-and oil-soluble types such as any of the peroxides such as caprylyl peroxide, benzoyl peroxide, potassium persulfate, persulfate/sulfite combinations, and the like. Buffers, chelating agents, reducing agents, dispersants or emulsifying agents and other polymerization adjuvants may be employed where desired.

Likewise a fine particle polyacrylate latex may be employed as a seed latex whereby the requisite additional quantity or quantities of the acrylate monomers are added to the once-formed latex to cause the desired increase in final particle size. As indicated above, the average diameter of the latex particles should be from 500 A. to about 8000 A., more preferably between about 1500 and about 8000 A., and most preferably between about 2000 and about 4000 A.

For use by itself in preparing the blends of this invention, the rubbery, gelled polyacrylate may be worked up by any technique not involving mechanical working of the polyacrylate material. Such mechanical working destroys the particulate identity of the latex particles. The value of the rubbery polyacrylate as a separately added impact-improver does not otherwise appear to be substantially affected by the various work-up procedures used in its production. For example, a polyacrylate latex may be co-agulated or precipitated by mixing it with acids or alcohols, or precipitated by freezing and the resulting solid dried. Likewise, such a latex can be spray-dried. Even the rubbery crumbs obtained by coagulation are composed of loose, physical aggregates, of latex particles. Such crumbs are easily broken down when mill-mixed with a vinyl chloride resin and the resulting milled sheet will contain latex-like particles of the gelled polyacrylate well-dispersed in the vinyl chloride resin matrix. The tough, gelled nature of the polyacrylate improves the latex particle integrity permitting such a method of blending. Mill-massed polyacrylate or other mechanically-worked forms of the polyacrylate do not disperse in this fashion when mixed with the vinyl chloride resin. However, obtained, wet polyacrylate coagulum should be dried at a temperature below about 75° C. and, preferably, at as low a temperature as possible to avoid sintering or melting.

Separately prepared latices of the polyacrylate and vinyl chloride resin components of the blend can be pre-mixed and the resulting blended latex co-coagulated, precipitated or spray-dried. Such a co-precipitation or co-coagulation procedure produces blends containing higher electrolyte and metal residues than are acceptable from the standpoint of best stability and highest resistance to water. This same objection applies to any product made by latex-style overpolymerization techniques. More preferred are procedures which involve either the mechanical blending of separately prepared purified polymeric components or the in situ polymerization by aqueous suspension techniques of the vinyl chloride resin in the presence of the polyacrylate particles.

COMPOSITE ADDITIVES

The particulate identity of the polyacrylate is best preserved by converting the polyacrylate into a composite additive where the small polyacrylate particles are already dispersed in a vinyl chloride resin matrix. For this use, the matrix resin should be a hard, non-tacky vinyl chloride resin derived from the in situ polymerization of a monomeric material consisting of at least 85%/wt. of vinyl chloride and not more than about 15%/wt. of propylene. Stated another way, the matrix resin should be selected from the class consisting of polyvinyl chloride and vinyl chloride/propylene copolymer resins containing from about 0.5% to about 10%/wt., more preferably from about 1% to about 7%/wt. of combined propylene.

In producing such a product, the proportion of matrix resin can vary considerably from as little as about 20% to 30%/wt. to as much as 200%/wt. or more. The lower proportion stated is about the minimum required to produce a non-tacky product and the upper limit is dictated more by convenience or cost than by technical consideration. In general, it is desirable to keep the proportion of polyacrylate high to permit higher dilutions with added vinyl chloride resins during the final blending step. For this reason, preferred products of this type contain from about 30% to about 70% wt. of the polyacrylate and from 70% to 30% wt. of the matrix resin. Most useful products of this type are powdered or granular forms which permit powder blending with vinyl chloride resins.

Such composite additives can be prepared by in situ polymerization of the matrix resin in the presence of a latex of the gelled polyacrylate or in the presence of a slurry of crumbs of the polyacrylate derived from such a latex. Such in situ polymerization can be carried out either in aqueous dispersion or emulsion or by polymerization in aqueous suspension. As already indicated, the latter is much preferred. Where the in situ polymerization is carried out with (1) a catalyst which is soluble in vinyl chloride and having relatively little solubility in water such as the oil-soluble organic peroxides and with (2) added colloidally-active suspension agent (as contrasted with a dispersing agent) such as gelatin, methyl cellulose, polyvinyl alcohol, bentonite clay and the like, the original polyacrylate latex or polyacrylate crumbs gradually disappear with the formation of a suspension or slurry of solid, macro-granular particles of uniform size and shape. Such a suspension method is most successful when relatively larger amounts of matrix resin are formed, that is, when the weight of matrix material is in excess of 35 to 40% by weight based on the weight of rubbery acrylate polymer. This method, however, is an admirable procedure for making the composite forms of gelled polyacrylate having between about 40% and about 200% or more by weight of matrix resin. This dispersion/suspension method produces a product of unique macro-granular particles of uniform shape and narrow particle size distribution which contains less of soap, dispersing agents and electrolyte.

OTHER INGREDIENTS

As in other more or less rigid vinyl chloride resin formulations, the blends of this invention may contain minor proportions of other ingredients such as fillers, colorants, opacifiers, lubricants, stabilizers, antioxidants, and others. Response of the blends of this invention to the effects of these and other additives is normal. A particularly preferred pigment which not only has strong tintorial power but which also appears to contribute somewhat improved processibility and impact strength is a rutile crystalline form of titanium dioxide. Filler loadings are permissible of up to 5 or 10% vol., more preferably from about 1 to about 5%/wt. based on the total weight of polymer in the blend. Barium-cadmium, tin-organic, lead organic, and inorganic lead stabilizers for vinyl chloride resins are preferred and may be employed in normal proportions of from about 0.1 to about 5%/wt. or more.

The invention will now be more fully illustrated with reference to several specific examples.

EXAMPLE I

Preparation of gelled polyacrylate

The following materials are employed in a polymerization carried out at about 40° C.:

| Material: | Parts/vol., parts/wt. |
|---|---|
| Water (distilled) ml | 2140 |
| $K_2S_2O_8$ gram | 1.0 |
| $K_2S_2O_5$ (5% aq. sol.) ml | 10 |
| Ethyl acrylate grams | 980 |
| Diethylene glycol diacrylate do | 20 |
| Siponate DS10 (10% aq. sol.)[1] ml | 40 |

[1] An emulsifier made by Alcolac Chemical Corporation and said to be a purified form of dodecyl benzene sodium sulfonate.

The water and $K_2S_2O_8$ are combined in a closed, stirrer-equipped reaction vessel in which oxygen has been displaced by nitrogen and the vessel and its contents are heated to about 40° C. at which point the $K_2S_2O_5$ is added. The ethyl acrylate and diethylene glycol diacrylate are pre-mixed and added portionwise to the stirred aqueous solution of catalyst at a rate to maintain the reaction temperature at 38 to 40° C. while cooling with air only. In about 40 minutes, after some 60 ml. of mixed monomer had been added, a 1 ml. portion of the 1% aqueous $Na_2S_2O_4$ solution is added. At the same time, there is added a 1 ml. portion of the 10% solution of emulsifier. Polymerization is continued in this fashion over a 7½ hour reaction period by continued addition of mixed monomer and the repetitive addition of 1 ml. of emulsifier solution for every 20 ml. of monomer added.

A stable latex results which is stirred for 19 minutes after all of the materials have been added and the latex briefly heated to 65° C. to destroy catalyst before cooling gradually. The latex is then stripped under vacuum to remove about 83 grams of residual unreacted monomers and water. There results a yield of 2973 grams of a stable latex containing 31.5%/wt. of total solids and having a pH of 3.6. This latex is first filtered and then tested by the soap titration technique which indicates an average particle size of 2660 A. in diameter.

About 600 ml. of this latex is poured into 1250 ml. of methanol with agitation to effect coagulation. A slurry of rubbery crumbs is obtained which is filtered and the crumbs dried in a vacuum oven at 50° C. Rubbery crumbs weighing 177 grams are obtained.

Because the usual extraction-types of sol-gel procedure is not applicable to such highly-gelled polymers as the polyacrylates of this invention, the solubility in toluene at room temperature of the rubbery polyacrylate is determined by an ultra-centrifuge technique. In this procedure, a measured quantity of the rubbery polyacrylate is placed in a sealed container with a measured quantity of toluene (or THF) and the sealed container rolled on a paint-type roller overnight (ca. 12–14 hours). The liquid content of the container is then separated by centrifuging at 30,000 r.p.m. and the dissolved solids content of an aliquot portion of the clear liquid determined and the percent/wt. soluble portion of the polyacrylate calculated. The crosslinked polyacrylate of this example is found by this procedure to be soluble in toluene at room temperature to the extent of only 2.5%/wt.

A latex of a low gel rubbery polyethyl acrylate having a particle size of 2000 A. is prepared by a similar procedure by omitting the diethylene glycol diacrylate. When worked up as described above the dried crumbs are found to be 64.8%/wt. soluble in toluene.

The highly gelled and low gel polyethyl acrylates prepared as described are each utilized in a series of blends with polyvinyl chloride. A standard polyvinyl chloride powder mix is first prepared by mixing in a Henschel mixer according to the following recipe:

| Material: | Parts/wt. |
|---|---|
| Geon 103EP [1] | 100 |
| Calcium stearate | 2 |
| Ti Pure R500 [2] | 5 |
| Hycar 2301X36 [3] | 3 |
| Thermolite 31 [4] | 3 |

[1] A commercially-available polyvinyl chloride, easy processing type, made by B. F. Goodrich Chemical Company, inherent viscosity 0.934 (0.2 gram in 100 m. cyclohexanone, ASTM D1243–65T).
[2] Rutile Crystalline TiO₂, made by Du Pont.
[3] Styrene/acrylonitrile resin, made by B. F. Goodrich Chemical Company.
[4] T. M. tin stabilizer, made by Metal and Thermite Corporation.

The two polyacrylates are utilized in preparing blends with the above polyvinyl chloride masterbatch. First, the masterbatch is milled until band formation (or fusion) occurs on one roll and then the crumbs of polyacrylate are added to the rolls. When a smooth, homogenous band is again formed, the time is recorded and the time of milling specified herein is measured from the latter time. The mill utilized is a two-roll differential plastics mill having oil-heated rolls four inches in diameter as is described above. In this example, separate samples of a blend containing 15 phr. of each of the polyacrylates are milled on the mill described for 2 minutes after band formation at roll temperature of 350° F., 380° F., 410° F., and 440° F. In addition, a separate sample of each blend is prepared on a low temperature, steam-heated mill having four inch mill rolls rotating at 12 r.p.m./18 r.p.m. and maintained at 335° F. In the latter case, the sample containing the low gel polyethyl acrylate would not form a band at 335° F. whereas the sample containing the gelled polyethyl acrylate did so easily. The resulting milled stocks are each cut off the mill and later (after cooling slowly to R.T.) preheated for 5 minutes at a temperature 10° F. higher than its milling temperature before being molded for 3 minutes in a standard ASTM tensile sheet mold maintained at the preheat temperature and under a pressure of 30,000 p.s.i.g. The ASTM Izod impact strength (ASTM No. D256–56, Method A) is determined on each of the resulting standard tensile sheets.

In FIG. 1 of the drawings, the Izod impact strengths thus determined are plotted against milling temperature (mill roll temperature). Note that the samples containing the gelled polyethyl acrylate (2.1% sol.) exhibited high impact strength irrespective of its milling temperature over the entire range of 335° F.–440° F. whereas the sample containing the low gel or soluble polyethyl acrylate would not form a band on the mill at 335° F. and the other samples of this blend did not develop appreciable impact strength until it was milled at a temperature in the range of 390–440° F. The highly gelled polyethyl acrylate is thus shown to form blends having wider processing latitude whereas the low gel polyethyl acrylate forms blends which appear to be considerably more critical in their processing.

Similarly, a second series of blends is prepared in which polyvinyl chloride is blended with 8, 10, 15 and 20 phr. of the 2.1% soluble gelled polyethyl acrylate of this Example I. All such blends are prepared by milling in a similar fashion for 2 minutes at 410° F. and test sheets molded therefrom as described above. Izod impact values determined on these sheets are shown plotted against composition in FIG. 3 of the drawings. Also included for purposes of comparison are data on blends similarly prepared but employing a small particle gelled polyethyl acrylate (750 A.). Note the high impact values shown. Note that the large particle (2000 A.) polyethyl acrylate is slightly more efficient than its small particle size counterpart. As is shown in FIG. 1, slightly higher Izod values are obtained on similar blends prepared at lower milling temperatures of 335 to 380° F.

EXAMPLE II

Figure 2:
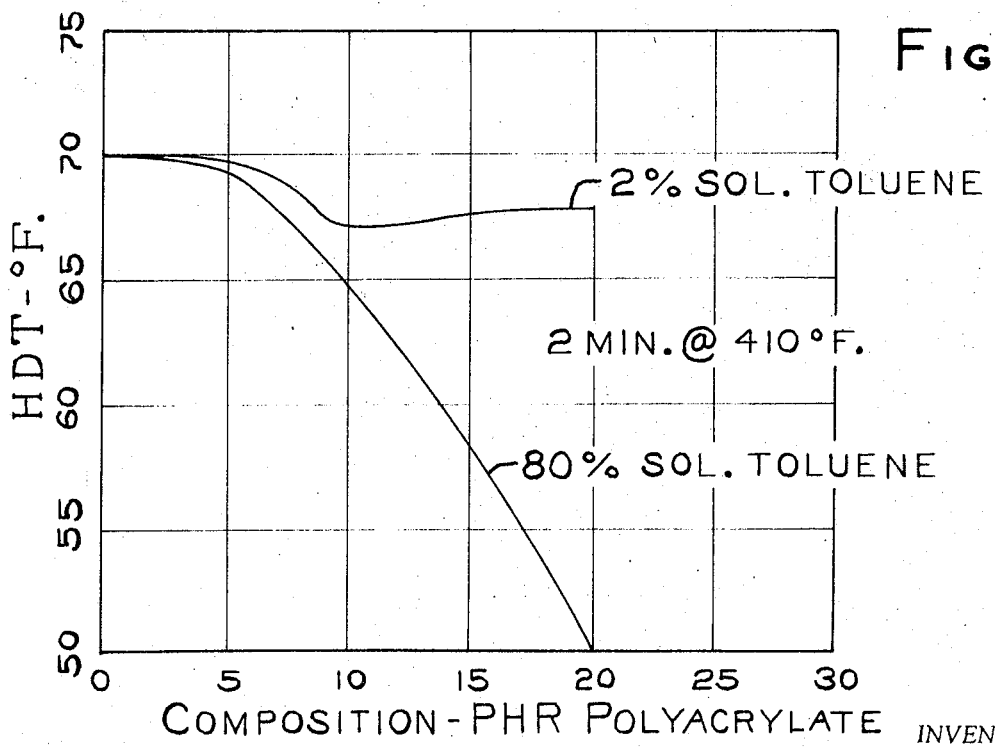
FIG. 2 is a graph in which the ASTM heat distortion temperature (HDT) is plotted against composition (expressed as phr. of polyacrylate) of blends of polyvinyl chloride with various proportions of (curve marked "2% sol. toluene") a gelled polyethyl acrylate and (curve marked "80/ sol. toluene") of a normal low gel polyethyl acrylate.

The experiments of Example I are repeated producing a gelled polyethyl acrylate which exhibits a solubility in toluene of only 2%/wt. and a low gel polyethyl acrylate which is 80%/wt. soluble in toluene. A series of blends with polyvinyl chloride are prepared with each of these polyethyl acrylates by combining the polyacrylate with various proportions of the same powdered polyvinyl chloride masterbatch so as to yield 5, 10, 15 and 20 phr. of the polyacrylate. These blends are all milled for 2 minutes at 410° F. Tensile sheets are prepared by preheating and molding at 420° F. as is described in Example I. The ASTM heat distortion temperature (HDT, ASTM No. 648–56, at 264 p.s.i.) obtained on these sheets are plotted against composition in FIG. 2 of the drawings. Note that while the addition of gelled polyethyl acrylate had relatively minor effects on HDT, the low-gel or more soluble polyethyl acrylate significantly reduced HDT when used at a level of 10 phr. or more. Thus, at the latter levels where optimum or highest impact strength is developed, the soluble polyacrylates seriously impair HDT.

Blends containing the same gelled polyethyl acrylate as was employed in the blends represented in FIG. 3 and the low gel polyethyl acrylate (64.8% sol.) employed in the blends represented in FIG. 1, all prepared by the same procedure but each containing 10 phr. of the polyacrylate are milled for varying times at 410° F. The Izod impact strengths determined on standard tensile sheets prepared by preheating the milled sheet for 5 minutes at 420° F. and molding for 3 minutes at 420 under 30,000 p.s.i. pressure are plotted against milling time in FIG. 4 of the drawings. The impact strength of the blends containing the highly gelled polyethyl acrylate does not decrease (rather increases), even after milling for as long as 15 minutes at 410° F. In contrast, the blends containing the low gel polyethyl acrylate are shown to suffer rapid loss of their impact strength even after milling for as little as 5 minutes at this temperature.

EXAMPLE III

In this example, blends of polyvinyl chloride with various commercially available impact-improvers are prepared for comparison with the results shown in FIGS. 1 through 4 of the drawings. The materials utilized are as follows:

(a) T.M. "Hycar 1010X43," a styrene-butadiene-acrylonitrile terpolymer made by B. F. Goodrich Chemical Company.

(b) T.M. "Blendex 301," said to be a styrene-acrylonitrile over-polymer on polybutadiene and made by Marbon Chemical Division of Borg-Warner.

(c) T.M. "Acryloid KM229,' said to be a methyl methacrylate over-polymer on styrene-butadiene (SBR) rubber, and made by Rohm and Haas.

Figure 5:
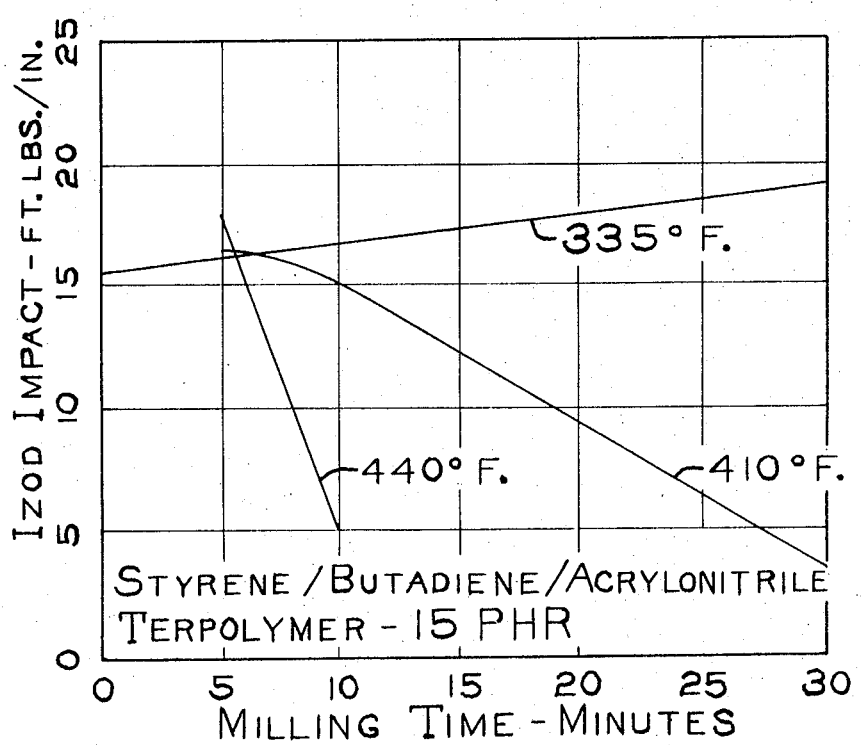
FIG. 5 is a graph similar to that of FIG. 4 in which the impact strengths of blends of polyvinyl chloride with a commercially available impact-improver, in this case a styrene/acrylonitrile/butadiene terpolymer.
Figure 6:
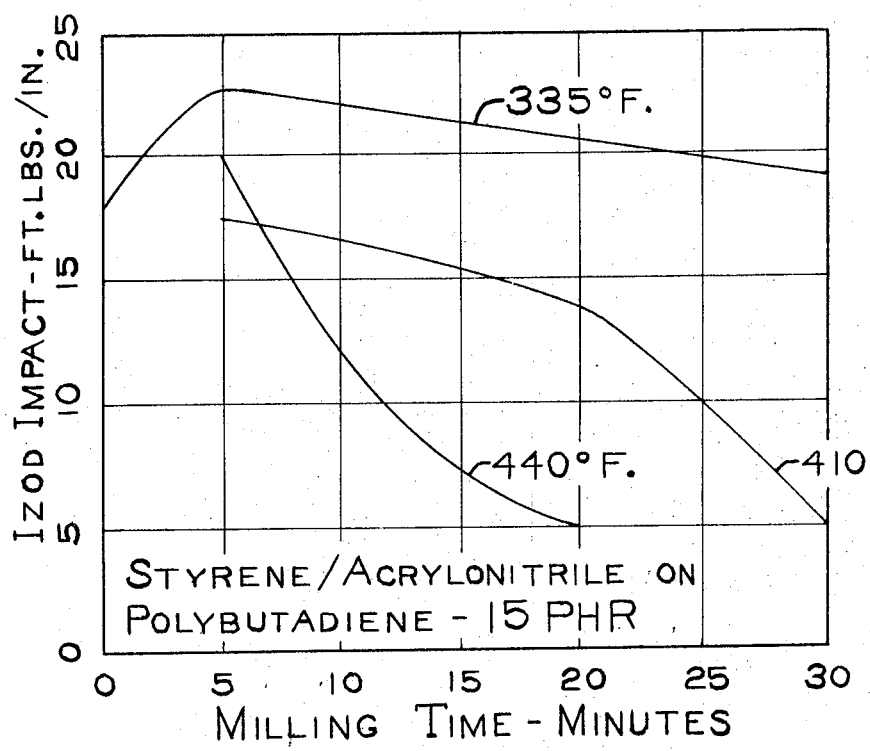
FIG. 6 is a graph similar to that of FIG. 5 in which the data is based on blends of polyvinyl chloride with another commercial impact-improver, in this case a styrene/acrylonitrile overpolymer on polybutadiene.
Figure 7:
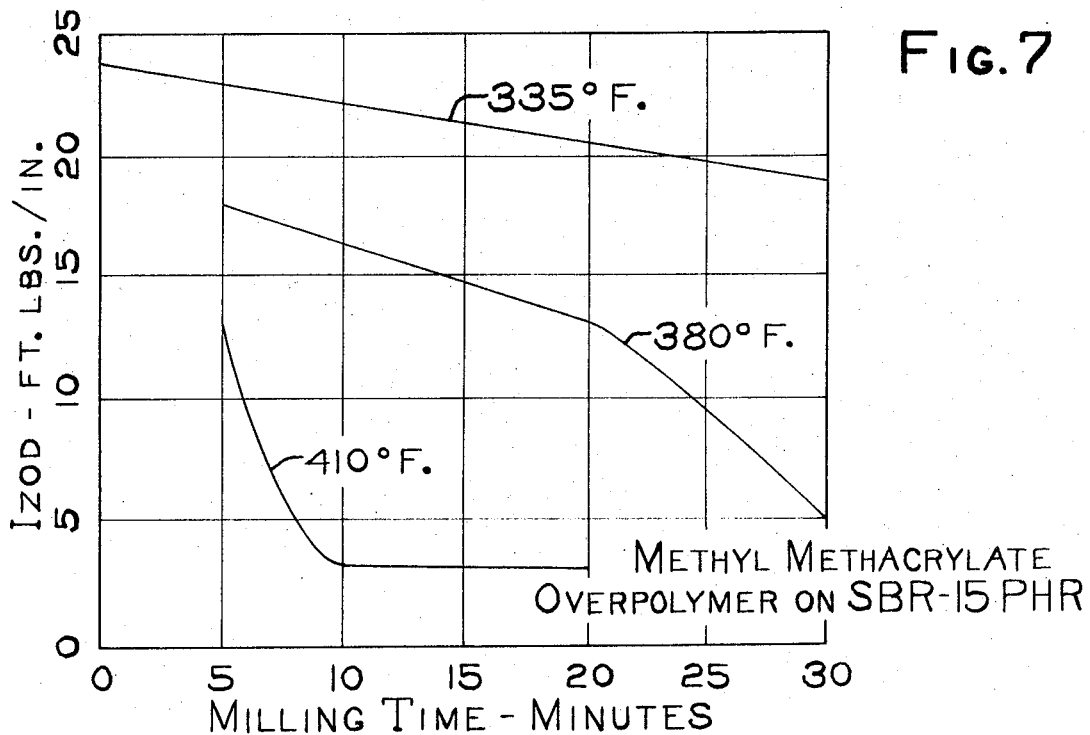
FIG. 7 is a graph similar to that of FIGS. 5 and 6 in which the data is based on blends of polyvinyl chloride with another commercial impact-improver, in this case a methyl methacrylate overpolymer on styrene/butadiene (SBR) rubber.

Blends with the powdered polyvinyl chloride masterbatch of Example I are prepared using the commonly employed concentration (15 phr.) of each of the above materials, these blends being prepared by milling for the times indicated on a 4-inch two-roll plastic mill. Samples of each blend in each series were milled for various times at several temperatures selected from 335° F., 380° F., 410° F. and 440° F. Tensile sheets are molded as described above and the Izod impact value determined on each sheet. The Izod impact values so obtained, on each rubbery modifier, are plotted against time of milling at temperature, respectively, in FIGS. 5, 6, and 7 of the drawings. While each of the commercial impact improvers is stable under milling at 335° F., note that in each case serious losses in impact strength resulted when the blends were milled at 380°, 410° or 440° F. Comparison of these results with those shown in FIGS. 1 through 4 of the drawings will show the much greater stability and wider processing latitude of the blends of this invention containing gelled polyacrylates.

EXAMPLE IV

In this example, a blend of polyvinyl chloride containing a gelled polybutyl acrylate is prepared. The polybutyl acrylate is prepared using the following materials:

| Material: | Parts/vol., parts/wt. |
| --- | --- |
| Water _____ ml__ | 420 |
| $K_2S_2O_8$ _____ gram__ | 0.2 |
| $K_2S_2O_5$ (5% sol.) _____ ml__ | 2 |
| Butyl acrylate _____ grams__ | 250 |
| Diethylene glycol diacrylate _____ do__ | 5 |
| Siponate DS 10 (10% sol.) _____ ml__ | 8 |

As before, the water and $K_2S_2O_5$ are combined with agitation under a nitrogen atmosphere and heated to 40° C. after which the $K_2S_2O_8$ is added. The butyl acrylate and diethylene glycol diacrylate are pre-mixed in a separate vessel and then added to the agitated catalyst solution in 1 ml. increments at a frequency adapted to maintain the reaction temperature at about 40° C. After 35 ml. of the mixed monomers had been added at first 1 ml. portion of the 10% emulsifier solution is added. Over a 2¾ hour reaction period, the total monomers and all of the emulsifier solution are added with the production of a stable latex. The latex is then filtered and vacuum stripped to remove residual unreacted monomers. A yield of 617 grams of latex containing 39.1% total solids and having a pH of 4.8 is obtained. When tested by the soap titration technique, the average latex particle size is found to be 7300 A. in diameter.

The resulting latex is poured into about 3 volumes of methanol to effect coagulation and the resulting crumbs are dried in a vacuum oven at 50° C. The dried, rubbery material is found to be only about 0.6%/wt. soluble in toluene.

Figure 8:
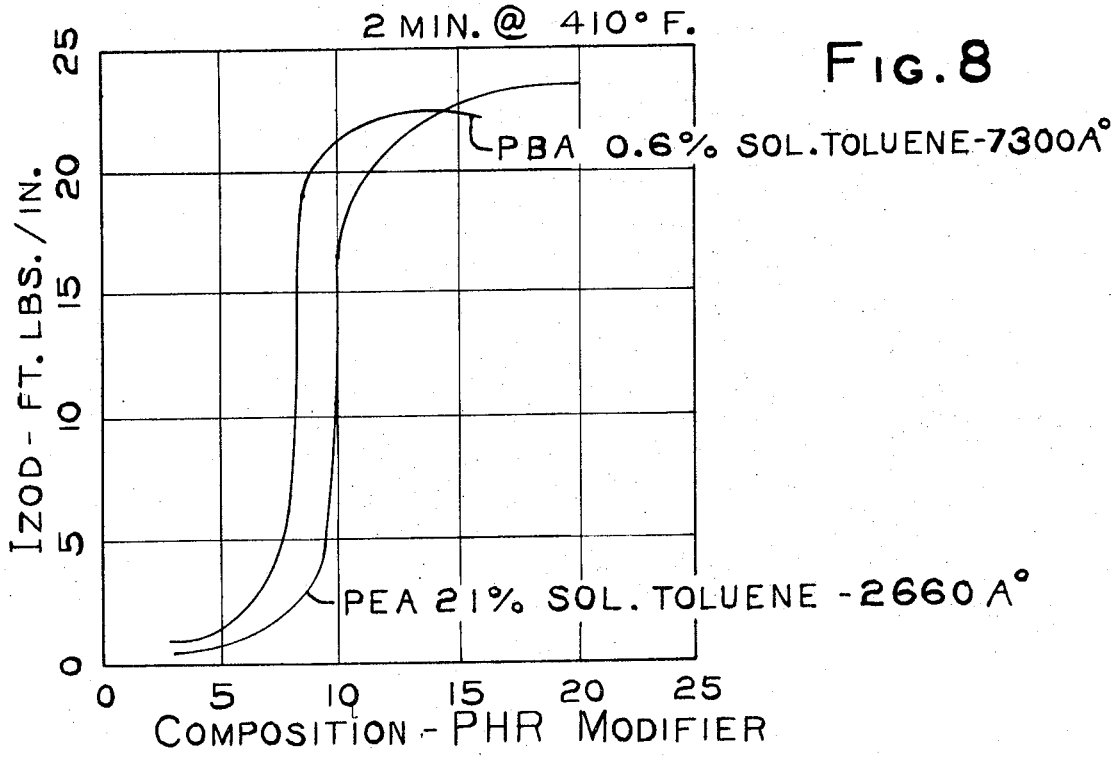
FIG. 8 is a graph similar to that of FIG. 3 showing the data obtained on blends containing either a gelled polyethyl acrylate or a gelled polybutyl acrylate, all blends having been prepared by milling for 2 minutes at 410° F.

Blends of the resulting gelled polybutyl acrylate (PBA) with polyvinyl chloride are prepared by milling the standard polyvinyl chloride masterbatch of Example I to band formation and then adding the highly-gelled polybutyl acrylate crumbs. Such blends are prepared by milling for 2 minutes at 410° F. after band formation. Standard tensile sheets are prepared under conditions given in the foregoing examples and Izod values determined on each. The Izod values are plotted against composition in FIG. 8 of the drawings. In the graph, comparable data on similar blends prepared from the gelled polyethyl acrylate (PEA) of Example I (2.1% sol.) are presented for purposes of comparison.

It is clear that the action of the gelled polybutyl acrylate is quite similar to that of the gelled polyethyl acrylate with the former if anything being slightly more efficient than the latter.

EXAMPLE V

Figure 9:
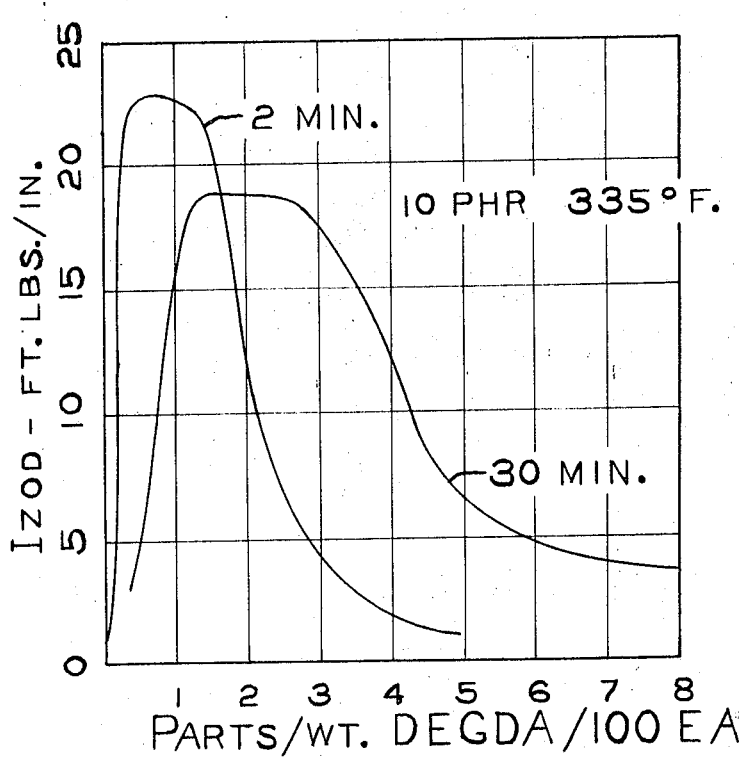
FIG. 9 is a graph in which Izod impact strength is plotted against parts/wt. of diethylene glycol diacrylate, these data having been taken on blends of polyvinyl chloride with 10 phr. of each of various gelled polyethyl acrylates prepared with various levels of ethylene glycol diacrylate.
Figure 10:
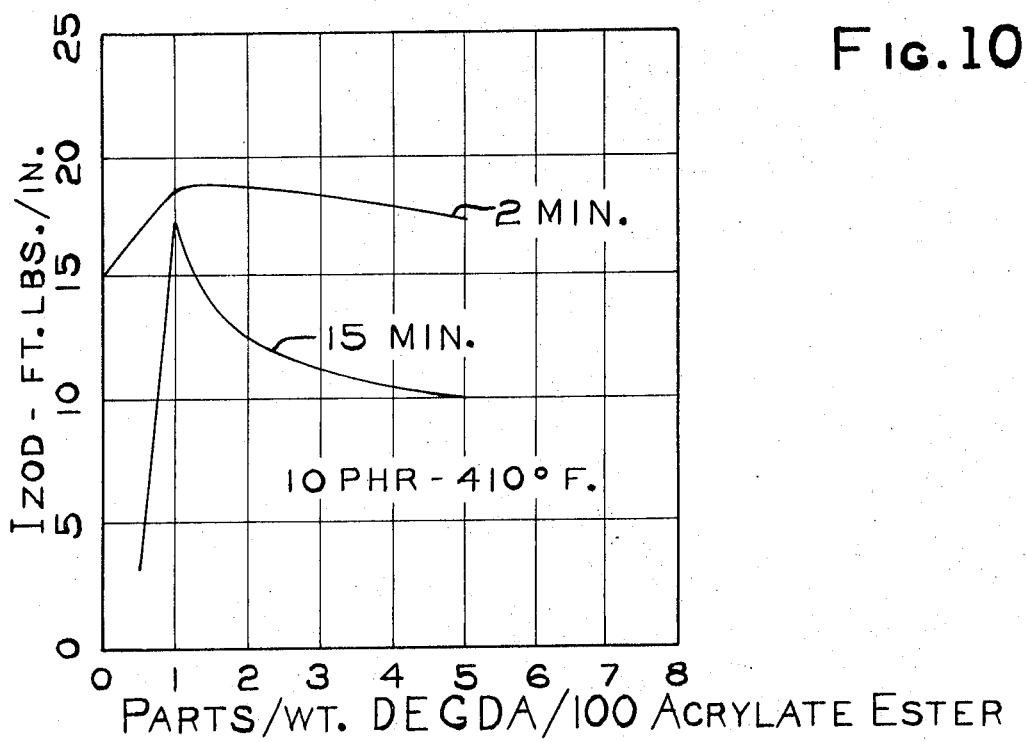
FIG. 10 is a graph similar to that of FIG. 9, the data represented having been taken on blends prepared by milling at 410° F.

In this example, the effects of various levels of gel-inducing monomer on the Izod values of the blends with polyvinyl chloride are evaluated. A series of gelled polyethyl acrylates are prepared employing, respectively, 0, 0.5, 1, 2, 3, 5 and 8 parts/wt. of diethylene glycol diacrylate per 100 parts/wt. of total monomers. The procedure employed is similar to that of Example I. Two sets of blends are prepared each containing 10 phr. of each of the resulting polyethyl acrylates, one such set being prepared by milling for 2 minutes at 335° F. and the other by milling for 2 minutes at 410° F., all employing procedures very similar to those of the foregoing example. Other sets of samples of each blend are prepared by milling for 30 minutes at 335° F. and for 15 minutes at 410° F. Tensile sheets are prepared from all of the blends and Izod impact values of each sheet determined. The resulting Izod values are plotted in FIGS. 9 and 10 of the drawings, FIG. 9 representing the 335° F. data and FIG. 10 the 410° F. data. Note that the all-around optimum level for diethylene glycol diacrylate is between about the 1 and about the 4 parts levels. For stocks intended for more extended milling at moderate temperatures, the optimum level appears to be between the 2 and 5 part levels. Below about the 1 part level, high impact strength is not developed at low mill temperatures nor is high impact strength retained as tenaciously on longer milling at the higher mill temperatures. Impact values are definitely lower above about 5%/wt. of the diacrylate. With more polyfunctional polyol acrylate esters such as trimethylol propane triacrylate, excellent results are obtained in the range of 0.5 to 3%/wt.

EXAMPLE VI

In this example, the often somewhat sticky, rubbery, gelled polybutyl acrylate is dispersed in polyvinyl chloride matrix by in situ polymerization and the resulting dry, granular or powdery material powder-blended with the powdered polyvinyl chloride masterbatch of Example I as in preceding examples. Several of these materials are prepared from latices prepared using the following materials:

Preparation of polyacrylates

| Material: | Parts/vol., parts/wt. |
| --- | --- |
| Water _____ ml__ | 2100 |
| $K_2S_2O_8$ _____ gram__ | 1 |
| $K_2S_2O_5$ (5%) _____ ml__ | 10 |
| $Na_2S_2O_4$ (1%) _____ ml__ | 2 |
| n-Butyl acrylate _____ grams__ | 1250 |
| DEGDA [1] _____ do____ | 38.5 |
| Emulsifier solution [2] _____ ml__ | 55 |

[1] Diethylene glycol diacrylate, mixture indicated composed of 97 parts/wt. of butyl acrylate and 3 phr. DEGDA.
[2] Same as in previous examples.

The polymerization temperature is 40° C. and procedure is similar to those utilized in the above example. The resulting latex is obtained in a yield of 3,223 grams, contains a total solids of 36.1%, has a pH of 5.3 and exhibits an average particle size of 2115 A. This gelled polybutyl acrylate exhibits a solubility of only 1.3%/wt. in THF.

A second latex of a gelled polybutyl acrylate is prepared using 2 parts/wt./100 of monomer trimethylol propane triacrylate (TMPTA) using the following materials:

| Materials: | Parts/vol., parts/wt. |
|---|---|
| Water ml__ | 840 |
| $K_2S_2O_8$ gram__ | 0.4 |
| $K_2S_2O_5$ (5%) ml__ | 4 |
| n-Butyl acrylate grams__ | 450 |
| TMPTA do____ | 9 |
| Siponate DS10 (10%) [1] ml__ | 26 |

[1] See Example I.

The polymerization is carried out at 40° C. using procedures illustrated in the foregoing examples. There is obtained a yield of 1219 grams of a stable latex containing 36.3%/wt. of total solids, a pH of 5.15 and an average particle size over 2000 A. Rubbery polybutyl acrylate isolated from this latex has a very low solubility in toluene of the order of a few tenths of 1%/wt.

The above latices are employed in the in situ polymerization technique carried out at 50° C. using the following materials:

| Material | 97/3 BA/DEGDA | 98/2 BA/TMPTA |
|---|---|---|
| Latex, g | 600 | 590 |
| $H_2O$, ml | 360 | 350 |
| Siponate DS10 (10%), ml | 4 | 9 |
| n-Butane, ml | 4 | 4 |
| Vinyl chloride, g | 400 | 400 |
| $Na_2S_2O_4$ (1%), ml | 1 | 1 |
| $K_2S_2O_8$ (2.5%) ml | 4 | 4 |

The first five listed ingredients are charged to a closed, stirrer-equipped reaction vessel which had been purged with nitrogen and this mixture heated and equilibrated at 50° C. for a few minutes, the $Na_2S_2O_4$ then added and, ten minutes later, the $K_2S_2O_8$ is added. Vigorous polymerization commences and is continued (as measured by pressure drop) for a total of 52 minutes at 50° C. in the case of the BA/DEGDA latex and 100 minutes for the BA/TMPTA latex. The excess vinyl chloride is then vented off in each case and the latex filtered before being poured into a large volume of methanol to which 3 ml. of 20% aqueous $CaCl_2$ has been added. The solid is separated in each case by filtering and the resulting solids dried at 50° C. in a vacuum oven. The product is a dry, powdery solid resembling polyvinyl chloride in appearance. The dry solids are weighed and analyzed for chlorine content. The data are as follows:

| | 97/3 BA/DEGDA | 98/2 BA/TMPTA |
|---|---|---|
| Yield, grams | 391 | 367 |
| Polyvinyl chloride, percent/wt.: | | |
| By difference | 46 | 42 |
| By chlorine analysis | 46 | 42.3 |

Figure 11:
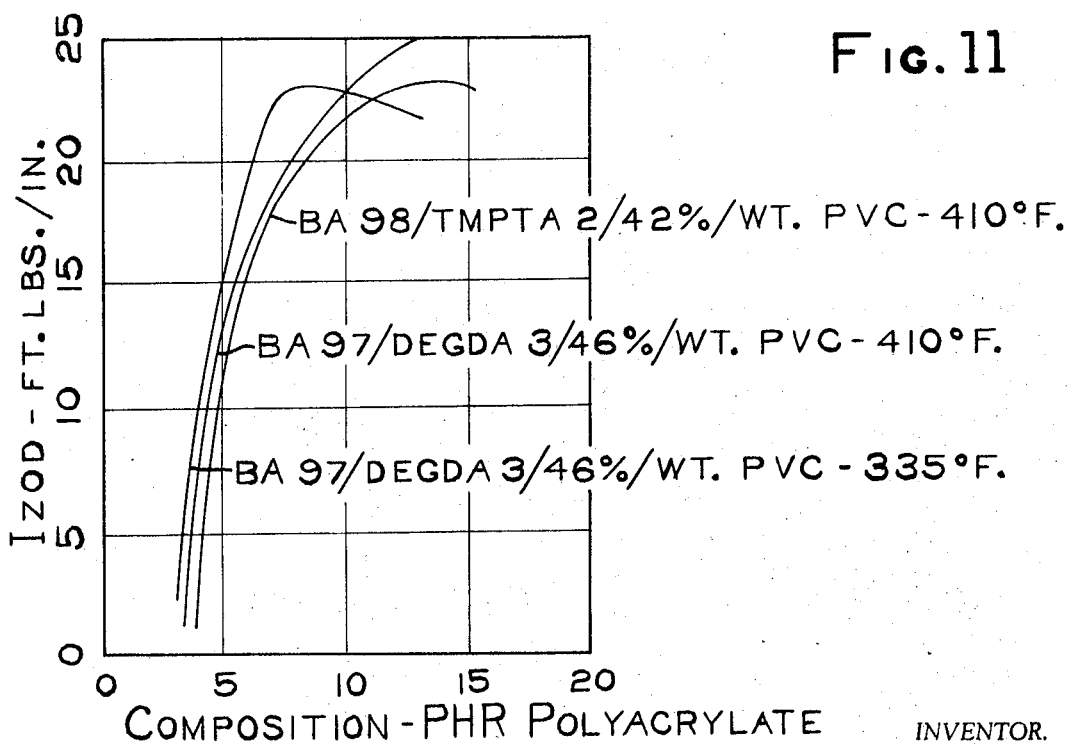
FIG. 11 is a graph similar to that of FIG. 3, the data having been taken on blends, prepared by milling for 2 minutes at the specified temperature from mixtures of polyvinyl chloride with each of several composite additives in which a gelled polybutyl acrylates is dispersed in a polyvinyl chloride matrix.

Blends of each of the above with the polyvinyl chloride masterbatch of Example I are prepared by milling the masterbatch until band formation occurs, then adding the polyacrylate impact improver, and milling for 2 minutes after band formation again occurs. Tensile sheets are prepared from resulting blends by procedures of the foregoing examples and Izod impact values determined. In preparing these blends, the weight of the in situ polymerized vinyl chloride is allowed for in calculating the required weight of masterbatch. Thus, blends are prepared employing 3.5, 6.8, 9.9 and 12.8 phr. of the rubbery polyacrylate material as such. FIG. 11 of the drawings presents three curves obtained with the blends of this example. One such curve presents the Izod values of the blends prepared by milling for 2 minutes at 410° F. and containing the polybutyl acrylate gelled with diethylene glycol diacrylate. Another of the curves presents similar data on similar blends prepared by milling for 2 minutes at 335° F. The third curve presents the data on blends prepared by milling for 2 minutes at 410° F. and containing the polybutyl acrylate gelled with trimethylol propane triacrylate. All of the blends are shown to exhibit high impact strength at levels somewhat lower than is obtained with similar polybutyl acrylates in crumb form.

Several samples of other blends of these materials are subjected to longer milling periods at 335° F. or 410° F. The data are as follows:

| Polyacrylate | Phr. | Milling Time, min. | Milling Temp., °F. | Izod, ft. lbs./in. |
|---|---|---|---|---|
| 97BA/3DEGDA/PVC 46 | 9.9 | 2 | 335 | 19.8 |
| Same as above | 9.9 | 5 | 335 | 22.9 |
| Do | 9.9 | 15 | 335 | 21.8 |
| Do | 9.9 | 2 | 410 | 22.6 |
| Do | 9.9 | 15 | 410 | 17.4 |
| Do | 6.8 | 15 | 410 | 18.3 |
| 98BA/2TMPTA/PVC 42 | 10 | 2 | 410 | 21.6 |
| Same as above | 10 | 15 | 410 | 22.0 |

These data indicate that the Izod values remain very high after extended milling over the entire range of 335°–410° F. Such a result demonstrates a very high degree of stability and an exceptionally wide processing latitude.

EXAMPLE VII

In this example, a copolymer of 97%/wt. of combined vinyl chloride and 3%/wt. of combined propylene is employed in a blend as a replacement for the polyvinyl chloride base resin in the polyvinyl chloride standard masterbatch of the previous examples. This copolymer has a dilute solution viscosity of 0.829 (0.4%/wt. solution in cyclohexanone at 30° C.) and exhibits a tensile strength of 6900 lbs./sq. in. when milled at 70° C. and molded into a tensile sheet. Several gelled polyacrylates are employed as impact improvers in this copolymer, all made using procedures and materials as described in the foregoing examples and identified as follows:

| Impact-improver | Monomer mixture | Notes |
|---|---|---|
| A | Ethyl acrylate 100, DEGDA 2 | Same as Ex. I. |
| B | n-Butyl acrylate 100 | Similar to Ex. II. |

The blends are prepared by milling for 2 minutes at 310° F. The resulting fused formulations are then remilled for 2 minutes after banding at either 350° F. or 380° F. and molded at respectively, 360 or 390° F. Izod values determined on the resulting molded tensile sheets are given below:

| Impact-improver additive | Composition, phr. | Milling temp., °F. | Izod, lbs./in. |
|---|---|---|---|
| A | 10 | 350 | 17.7 |
| B | 10 | 380 | 17.8 |

The blends of this example have very good finish and stability as well as very good impact strength for a copolymer vinyl chloride resin.

EXAMPLE VIII

In this example, blends are prepared employing a vinyl chloride/propylene copolymer as the base vinyl chloride resin and, as an impact-improver, a gelled polybutyl acrylate dispersed in a vinyl chloride/propylene copolymer matrix. The base vinyl chloride/propylene copolymer is prepared by polymerization in aqueous dispersion of a mixture of 90%/wt. of vinyl chloride and 10%/wt. of propylene and contains 2.7%/wt. of combined propylene and exhibits a dilute solution viscosity of 0.829 (0.4%/wt. in cyclohexanone at 30° C.) The impact-improver is prepared from a gelled polybutyl acrylate prepared by procedures similar to those of the foregoing examples from a mixture of 97 parts/wt. of n-butyl acrylate and 3 parts/wt. of diethylene glycol diacrylate. The resulting gelled polybutyl acrylate exhibits an average particle size over 2000 A. in diameter and a very low solubility in THF (Ca. 1.3%/wt.) The in situ polymerization is carried out at 36° C. employing the following materials:

| Material; | Parts/wt., parts/vol. |
|---|---|
| Water _____ml__ | 1017 |
| Polyacrylate latex (37.4% T.S.) ____grams__ | 160 |
| Sipon solution (emulsifier, 10%) _____ml__ | 10 |
| $K_2S_2O_8$ (2% sol.) _____ml__ | 15 |
| $K_2S_2O_5$ (4% sol.) _____ml__ | 3.3 |

Vinyl chloride monomer and monomeric propylene are added to the above mixture after the mixture had reached 36° C. according to the following schedule:

| Time (hrs.) | 0.2 | 1 | 2 | 4 | 5.4 | 6.5 | 7.5 |
|---|---|---|---|---|---|---|---|
| Vinyl chloride (g.)* | 76 | 105 | 167 | 212 | 254 | 305 | 351 |
| Propylene (g.)* | 13 | 13 | 18 | 18 | 18 | 36 | 36 |
| Pressure (p.s.i.g.)* | | 84 | 85 | 91 | 91 | 90 | 90 |

*Cumulative.

At the end of the reaction there is added 1 ml. of a 50% solution of t-butyl cresol in THF and 1 ml. of a 2%/wt. aqueous hydroquinone solution as a stabilizer-shortstop. After coagulation, there is obtained a yield of 172 grams of a solid, granular product containing 65%/wt. of vinyl chloride/propylene copolymer and 35%/ft. of polybutyl acrylate.

Blends of the base vinyl chloride/propylene copolymer and the over-polymerized polybutyl acrylate are prepared as follows:

| | Phr. | | |
|---|---|---|---|
| Base resin | Impact-improver | Polyacrylate* | Izod |
| 71.4 | 28.6 | 10 | 22 |
| 57.1 | 42.9 | 15 | 23 |
| 42.8 | 57.2 | 20 | 22 |
| 100 | | | 0.4 |

*Less matrix resin.

These blends on which the above data is based are prepared by combining the listed proportions of resins in each case with 3 grams of Thermolite 31 stabilizer, 2 grams of calcium stearate lubricant and 5 grams of titanium dioxide pigment (Ti-Pure R500). The mixtures are milled for 4 minutes at 350° F., preheated 4 minutes at 350° F. and molded for 4 minutes at 350° F. under 30,000 p.s.i.g. The resulting tensile sheets are tested for Izod impact values with results given above.

It is clear that the matrix dispersed form of polybutyl acrylate very substantially improved the impact strength of the vinyl chloride/propylene base resin. The blends exhibited very good processing behavior during blending and molding.

EXAMPLE IX

In this example, flexural modulus data are determined on a number of the blends of this invention based on polyvinyl chloride. Both the various polyacrylate impact/improvers and blends employed in this example are prepared by procedures similar to those of the foregoing examples. The data given below lists the particular impact-improver by its monomeric composition, the proportion of the latter employed, the time and temperature of milling of the blend, and the flexural modulus ($E_B$):

| | | Milling cycle | | | |
|---|---|---|---|---|---|
| Sample No. | Impact-improver | Time, min. | Temp., °F. | Phr. | EB |
| 972A | None | 2 | 410 | None | 346,990 |
| 697C | EA97/DEGDA3 | 2 | 410 | 5 | 355,560 |
| 1005C | BA100/DEGDA3 | 2 | 410 | 10 | 345,950 |

All of these blends are excellent rigid materials.

EXAMPLE X

In this example, different blend recipes are employed by omitting one or more of the ingredients in the standard polyvinyl chloride masterbatch used in most of the preceding examples. The procedure is otherwise similar to that of the preceding examples. The polyacrylate impact-improver employed is a gelled polybutyl acrylate prepared from a mixture of 97 parts/wt. of n-butyl acrylate and 3 parts/wt. of diethylene glycol diacrylate and having a solubility in THF of 7.5%/wt. The composition of the blends is given below. All blends were milled for 5 minutes at 410° F., preheated 5 minutes at 420° F. and press molded to standard tensile sheets for 3 minutes at 420° F. under a pressure of 30,000 p.s.i. The data are as as follows:

| | Parts/weight | | | | | |
|---|---|---|---|---|---|---|
| Sample No. | J | I | F | C | A | Control [1] |
| Geon 103 EP [2] | 100 | 100 | 100 | 100 | 100 | 100 |
| Thermolite 31 [2] | 3 | 3 | 3 | 3 | 3 | 3 |
| TiPure R500 [2] | | 5 | | 5 | 5 | 5 |
| Calcium stearate | | | 2 | 2 | 2 | 2 |
| Hycar 2301 x36 | | | 3 | | 3 | 3 |
| Polyacrylate | 10 | 10 | 10 | 10 | 10 | |
| Izod, ft. lbs./in. | 19.4 | 16.5 | 13.8 | 20.8 | 18.1 | 0.4 |

[1] No polyacrylate.
[2] See Example I.

These data indicate clearly that the high impact strength of the blends of this invention is due to the combination of the vinyl chloride base resin and the gelled polyacrylate and not to any other combination of compounding ingredients.

I claim:
1. In blends of a vinyl chloride resin and of a rubbery polymer of an alkyl acrylate, the improvement which comprises employing as said vinyl chloride resin a thermoplastic resin free of plasticizer and selected from the class consisting of polyvinyl chloride and copolymers of vinyl chloride and propylene containing from about 0.5 to about 10%/wt. of combined propylene and as said acrylate polymer a rubbery essentially completely gelled polymer of a monomeric mixture free of conjugated unsaturation and comprising at least about 80% by weight of an alkyl acrylate in which the alkyl group contains from 2 to 4 carbon atoms, up to about 19.5% by weight of a monomer copolymerizable with said alkyl acrylate and containing a single $CH_3{=}C{<}$ group per molecule, and from about 0.5 to about 8% by weight of a gel-inducing monomer copolymerizable with said alkyl acrylate and selected from the class consisting of (a) a monomeric acrylic polyester of a polyhydric alcohol and of an acrylic acid selected from the class consisting of acrylic and methacrylic acids and containing from 2 to 6 acrylic ester groups per polyester molecule and (b) a polyalkenyl polyether of a polyhydric alcohol containing from 2 to 6 alkenyl ether groups per molecule and in which the said alkenyl ether groups are each present in the structure $CH_2{=}C{<}$, said acrylate polymer evidences a solubility in toluene at room temperature to the extent of less than 20%/wt. and is present in said blend as dispersed particles of average diameter between about 500 and about 8000 A., said thermoplastic resin exhibiting an inherent viscosity as determined at 30° C. according to ASTM D1243 employing 0.2 gram resin in 100 ml. of cyclohexanone, if polyvinyl chloride of between 0.45 and 1.20 and, if a copolymer of vinyl chloride and propylene of between .55 and 11.60 and said blend contains as polymeric ingredients from about 2% to about 20% by weight of said gelled acrylate polymer and from about 80% to about 98% by weight of said vinyl chloride resin.

2. A blend as defined in claim 1 and further characterized by said vinyl chloride resin being a thermoplastic polyvinyl chloride of inherent viscosity from about 0.45 to about 1.45, by said gelled acrylate polymer being present in the form of particles having an average diameter from about 1500 to about 8000 A., and by said blend being of powder form containing said polyvinyl chloride free of particles smaller than 5 microns diameter, which will pass a 42 mesh screen and which will be retained 100% by a 325 mesh screen.

3. A blend as defined in claim 1 and further characterized by said vinyl chloride being a thermoplastic polyvinyl chloride of inherent viscosity from about 0.55 to about 1.2 by said gelled acrylate polymer being a copolymer soluble in toluene at room temperature less than 10% by weight and which is produced by the polymerization in aqueous emulsion of a monomeric material consisting of said alkyl acrylate and between about 1% and about 5% by weight of a monomeric acrylic polyester of a polyalkylene glycol and of acrylic acid, said polyester containing from 2 to 6 acrylate ester groups per polyester molecule, and by said gelled acrylate polymer being present in said blend as latex-derived particles of average diameter between about 2000 and about 8000 A.

4. In blends of a vinyl chloride resin and of a rubbery polymer of an alkyl acrylate, the improvement which comprises employing as the vinyl chloride resin a thermoplastic, plasticizer-free polyvinyl chloride of inherent viscosity from about 0.55 to about 1.2 and as said polymer of an alkyl acrylate a rubbery, essentially completely gelled copolymer soluble in toluene at room temperature to the extent of less than 10% by weight and produced by polymerization in aqueous emulsion of a monomeric material consisting of an alkyl acrylate in which the alkyl group contains from 2 to 4 carbon atoms and from about 1% to about 5% by weight of a gel-inducing monomeric acrylic polyester of a polyalkylene glycol and of acrylic acid, said polyester containing from 2 to 6 acrylate ester groups per polyester molecule, said rubbery gelled copolymer constituting from about 5% to about 15%/wt. of said blend and having been added to such blend as latex-derived particles of average diameter between about 1500 and about 8000 A., and said blend is in a fully-fused, mechanically-worked condition in which the said blend exhibits high impact strength.

5. A blend as defined in claim 4 and further characterized by said rubbery, gelled copolymer being a copolymer, as defined, of ethyl acrylate and having been added to the blend as latex-derived particles of average diameter between about 2000 and about 400 A.

6. A blend as defined in claim 4 and further characterized by said rubbery, gelled copolymer being a copolymer, as defined, of n-butyl acrylate.

7. A blend as defined in claim 4 and further characterized by said rubbery, gelled copolymer having been added to the blend in the form of latex-derived particles of the size specified uniformly dispersed in a matrix of a hard, non-tacky vinyl chloride/propylene copolymer resin derived by the in situ polymerization in the presence of said particles of said gelled copolymer of a monomeric material consisting of at least 85% by weight of vinyl chloride and 0.5% to 15% by weight of propylene, said matrix resin constituting from about 20% to about 200% by weight based on the weight of said latex-derived particles of rubbery copolymer.

8. A blend as defined in claim 4 and further characterized by said rubbery, gelled copolymer having been added to the blend in the form of latex-derived particles of the size specified uniformly dispersed in a matrix of polyvinyl chloride derived by the in situ polymerization of vinyl chloride in the presence of said gelled copolymer latex particles, said matrix constituting from about 20% to about 200% by weight based on the weight of said rubbery copolymer particles.

9. A blend as defined in claim 4 and further characterized by said rubbery, gelled copolymer being added to the blend in the form of latex-derived particles of the size specified uniformly dispersed in a matrix of a vinyl chloride/propylene copolymer containing from about 0.5% to about 10% by weight of combined propylene and having an inherent viscosity between about 0.55 and about 1.60 derived by the in situ polymerization of mixtures of vinyl chloride/propylene in the presence of said gelled copolymer latex particles, said matrix constituting from about 20% to about 200% by weight based on the weight of said rubbery copolymer particles.

10. A high impact resinous composition comprising (a) particles from 42 to 325 mesh in size of a copolymer of vinyl chloride and propylene, which copolymer is free of plasticizer, has an inherent viscosity from about 0.55 to about 1.60 and contains from about 1% to about 7% by weight of combined propylene and (b) particles of a composite modifier comprising a rubbery, essentially completely gelled copolymer soluble in toluene at room temperature to the extent of less than 10% by weight uniformly dispersed in a matrix of a hard, non-tacky vinyl chloride/propylene copolymer of the type defined, said composite modifier having been derived by in situ suspension polymerization of mixtures of vinyl chloride and propylene in the presence of a latex of said rubbery copolymer having an average latex particle size between about 1500 and 8000 A., said latex of said rubbery copolymer having been derived by the polymerization in aqueous emulsion of a two-component monomeric mixture comprising an alkyl acrylate in which the alkyl group contains from 2 to 4 carbon atoms and, as a gel-inducing comonomer, from about 1% to about 5% by weight of a monomeric acrylic polyester of a polyalkylene glycol and of acrylic acid, said polyester containing from 2 to 6 acrylate ester groups per polyester molecule, said modifier consisting of from about 20% to about 200% by weight of said matrix, based on the weight of said rubbery copolymer, and said blend containing from about 80% to about 95% by weight of said vinyl chloride/propylene copolymer and from about 5% to about 20% by weight of said rubbery copolymer particles.

11. A method of making a fused resinous blend having high impact strength comprising blending (a) from about 80% to about 98% by weight of a rigid, thermoplastic vinyl chloride resin low in plasticizer and derived from the polymerization of monomeric material containing not less than about 90% by weight of vinyl chloride and not more than 15%/wt. of propylene with (b) from about 2% to about 20% by weight of rubbery particles averaging between about 1500 and about 8000 A. in diameter and comprising a rubbery, essentially completely gelled polymer of a monomeric material free of conjugated unsaturation and comprising of at least 80% by weight of an alkyl acrylate in which the alkyl group contains from 2 to 4 carbon atoms, up to about 19.5% by weight of a monovinylidene monomer copolymerizable with said alkyl acrylate and, as a gel-inducing monomer, from about 0.5% to about 8% by weight of a gel-inducing monomer selected from the class consisting of (i) the monomeric acrylic polyester of a polyhydric alcohol and of an acrylic acid selected from the class consisting of acrylic and methacrylic acids, which polyester contains from 2 to 6 acrylic ester groups per polyester molecule and (ii) the polyalkenyl polyesters of polyhydric alcohols containing from 2 to 6 alkenyl ether groups per molecule and in which the said alkenyl ether groups are each present in the structure $CH_2=C$, said rubbery particles having a solubility in toluene at room temperature less than about 20% by weight, and effecting fusion of the resulting mixture under shear at a temperature of from about 320 to about 440° F. to impart high impact strength to the resultant fused blend.

12. The method as defined in claim 11 and further characterized in that said (a) vinyl chloride resin is polyvinyl chloride and said (b) rubbery gel particles have an average diameter of from about 2000 to about 4000 A. and comprise the latex particles of a rubbery copolymer produced by polymerization in aqueous emulsion from a monomeric mixture consisting of from 95% to about 99%/wt. of ethyl acrylate and from about 1% to about 5% of a monomeric acrylic polyester of a polyalkylene glycol and of acrylic acid containing from about 2 to 6 acrylate ester groups per polyester molecule.

13. A method of making a resinous blend of high impact strength comprising polymerizing in aqueous emulsion a monomeric mixture free of conjugated unsaturation and consisting of from about 96 to about 99% by weight of an alkyl acrylate in which the alkyl group contains from 2 to 4 carbon atoms and from 1 to 4% by weight of a monomeric acrylic polyester of a polyalkylene glycol and of acrylic acid containing from 2 to 6 acrylate ester groups per polyester molecule, said polymerization being carried out to produce a latex containing particles of average diameter from about 1500 to about 8000 A. and the resulting copolymer being rubbery and soluble in toluene at room temperature to the extent of less than 10% by weight, adding a second monomeric material to the resulting latex consisting of at least 85% by weight of vinyl chloride and not more than 15% by weight of propylene and effecting polymerizing of said second monomeric material in the presence of said latex particles thereby to produce in situ from about 20% to about 200% by weight of a vinyl chloride matrix resin, based on the weight of said latex particles, removing the water from the resulting latex, mixing the resulting solid composite product with a vinyl chloride base resin selected from the class consisting of polyvinyl chloride and copolymers of vinyl chloride and propylene containing from 0.5 to 10% by weight of combined propylene, and effecting fusion of the resulting mixture under shear at temperatures of from about 325 to 440° F. to produce a fused blend having high impact strength.

14. A method as defined in claim 13 and further characterized by said rubbery copolymer being a copolymer of ethyl acrylate, said vinyl chloride matrix resin is polyvinyl chloride, and said vinyl chloride base resin is polyvinyl chloride of inherent viscosity from about 0.55 to about 1.2.

15. A method as defined in claim 13 and further characterized by said rubbery copolymer being a copolymer of n-butyl acrylate, said vinyl chloride matrix resin is a copolymer of vinyl chloride and propylene, and said vinyl chloride base resin is polyvinyl chloride of inherent viscosity from about 0.55 to about 1.2.

16. A method as defined in claim 13 and further characterized by said rubbery copolymer being a copolymer of n-butyl acrylate, and by both said vinyl chloride matrix and base resins being polyvinyl chloride of inherent viscosity from about 0.55 to about 1.2.

17. A method as defined in claim 13 and further characterized by said rubbery copolymer being a polymer of n-butyl acrylate and by both said vinyl chloride matrix resin and said base resin being a copolymer of vinyl chloride and propylene containing from about 1% to about 7% by weight of combined propylene.

References Cited

UNITED STATES PATENTS 3,055,859    9/1962    Vollmert _____ 260—899

FOREIGN PATENTS 584,015    1/1947    Great Britain _____ 260—899

MURRAY TILLMAN, Primary Examiner

C. SECCURO, Assistant Examiner

U.S. Cl. X.R.

260—AR, 876 R, 884, 898, 891, 899

PO-1050
(5/69)

UNITED STATES PATENT OFFICE
CERTIFICATE OF CORRECTION

Patent No. 3,644,576          Dated February 22, 1972

Inventor(s) Eugene J. Sehm

It is certified that error appears in the above-identified patent and that said Letters Patent are hereby corrected as shown below:

Col. 4, line 58, "addition" should read --additives--.
Col. 6, line 53, "35°" should read --335°--.
Col. 8, line 6, "molecular" should read --molecule--.
Col. 15, table, line 32 "360" should read --350--.
Col. 17, line 29, "ft" should read --wt--.
Col. 20, line 56, "polyester" should read --polyethers--

Signed and sealed this 26th day of September 1972.

(SEAL)
Attest:

EDWARD M. FLETCHER, JR.          ROBERT GOTTSCHALK
Attesting Officer          Commissioner of Patents

Disclaimer 3,644,576.—*Eugene J. Sehm*, Akron, Ohio. IMPACT-RESISTANT RESINOUS BLENDS CONTAINING VINYL CHLORIDE POLYMER AND METHOD OF MAKING SAME. Patent dated Feb. 22, 1972. Disclaimer filed June 21, 1971, by the assignee, *The B. F. Goodrich Company.*

Hereby disclaims the portion of the term of the patent subsequent to Jan. 4, 1989.

[*Official Gazette October 16, 1973.*]